Patented June 10, 1941

2,245,190

UNITED STATES PATENT OFFICE 2,245,190

PETROLEUM NITROSULPHONIC ACIDS AND METHOD OF MAKING SAME

William K. Griesinger, Lansdowne, and Bernard Bettman, Cynwyd, Pa., assignors to The Atlantic Refining Company, Philadelphia, Pa., a corporation of Pennsylvania No Drawing. Application April 6, 1938, Serial No. 200,552

5 Claims. (Cl. 260—504)

The present invention relates to the production of petroleum nitrosulphonic acids which are of particular utility as dye intermediates in the preparation of azo dyes.

A principal object of this invention is the production of water-soluble petroleum nitrosulphonic acids from petroleum acid sludge.

A further object of this invention is the production of water-soluble petroleum nitrosulphonic acids having an average molecular weight in excess of about 245 and consisting essentially of a carbocyclic nucleus containing as substituents at least one nitro group and one sulphonic acid group, and one or more side-chains having from 3 to 12 carbon atoms each. Such nitrosulphonic acids are of particular utility in the preparation of aminosulphonic acids and diazonium compounds which may be coupled with phenolic compounds or amines to produce water-soluble azo dyes of distinctive shades and of a fastness not hitherto attainable in azo dyes manufactured from commercially available sulphonic acids such as sulphonilic acid, metanilic acid and the like.

In accordance with our invention, a petroleum distillate having an initial boiling point of at least 200° F. is treated with a sulphonating agent such as 98% sulphuric acid or fuming sulphuric acid under such conditions that a substantial portion of the distillate is converted into water-soluble sulphonic soluble in the acid sludge resulting from the treatment. The unsulphonated portion of the distillate is separated from the acid sludge containing water-soluble sulphonic acids and such sludge is subjected to the action of a nitrating agent, for example, nitric acid or a mixture of nitric and sulphuric acids, whereby the petroleum sulphonic acids are converted into nitrosulphonic acids likewise soluble in the sludge-nitration mixture. In order to recover the nitrosulphonic acids from the sludge-nitration mixture, the latter is intimately contacted with an organic solvent, for example, benzene or nitrobenzene, which is capable of selectively extracting the nitrosulphonic acids without dissolving any substantial amount of spent nitration agent. The solution of nitrosulphonic acids in the organic solvent is then preferably washed with water to extract therefrom substantially all of the nitrosulphonic acids. The aqueous solution, containing nitrosulphonic acids substantially free of oil and/or sludge, may then be neutralized with an alkali, for example, sodium hydroxide and the water evaporated therefrom to produce a mixture of crystalline sodium nitrosulfonates.

In lieu of evaporating the water from the aqueous solution above mentioned, the nitrosulphonates contained therein may be subjected to the action of a reducing agent such as sodium sulphide or ammonium sulphide to produce aminosulphonates which may be marketed as such, or subjected to diazotization with nitrous acid and coupled with a dye-forming compound such as phenol, naphthol or various amines.

Our invention may be further illustrated by the following examples, which, however, are not to be construed as limiting the scope thereof.

(1) 400 parts by weight of a naphtha distillate derived from Venezuelan crude oil and having a boiling range of 250° F. to 360° F. was contacted with 184 parts by weight of 98% sulphuric acid for a period of ½ hour at a temperature of 165° F. to 190° F. Unreacted oil was separated from the acid sludge resulting from this treatment, such sludge comprising spent acid, tar and water-soluble sulphonic acids and amounting to about 225 parts by weight. This sludge, at a temperature of about 125° F. was treated with a mixture of 143 parts by weight of 70% nitric acid and 275 parts by weight of 93% sulphuric acid for a period of about 6 hours, whereby the water-soluble sulphonic acids contained in the sludge were converted to nitrosulphonic acids. The nitrated sludge was then washed with 2400 parts by weight of nitrobenzene, whereby substantially all of the nitrosulphonic acids and a small amount of tar were extracted. The nitrobenzene solution was thereafter washed with water to extract therefrom the nitrosulphonic acids substantially free of tar, and the aqueous solution was neutralized with sodium hydroxide and evaporated to dryness whereby there was obtained 91.6 parts by weight of crystalline sodium nitrosulphonates having a molecular weight of 267.

(2) A gas oil distillate derived from East Texas crude oil and having a boiling range of from about 400° F. to about 600° F. was sulphonated by treating with 98% sulphuric acid and the acid sludge containing water-soluble sulphonic acids was separated from unreacted oil. 201 parts by weight of this acid sludge was treated with 35 parts by weight of 70% nitric acid at a temperature of about 120° F. for a period of about 1 hour to convert the sulphonic acids of the sludge into nitrosulphonic acids. The nitrated sludge was then washed with about 800 parts by weight of nitrobenzene, whereby substantially all of the nitrosulphonic acids and a small amount of tar were extracted from the mixture. The nitrobenzene solution was thereafter washed with about 100 parts by weight of water to extract therefrom the nitrosulphonic acids substantially free of tar, and the aqueous solution was neutralized with sodium hydroxide and evaporated to dryness whereby there was obtained 32.4 parts by weight of sodium nitrosulphonates having a molecular weight of 365.

(3) 185 parts by weight of a naphthenic oil fraction extracted from an East Texas lubricating oil distillate by means of nitrobenzene, and having a Saybolt universal viscosity of 80 seconds at 210° F. and a boiling range of from about 474° F. to about 700° F. at a pressure of 10 m. m., was diluted with 150 parts by weight of paraffinic petroleum naphtha and the mixture was treated with 147 parts by weight of 98% sulfuric acid at a temperature of about 160° F. for about 1 hour. The unsulphonated oil was separated from the acid sludge containing water-soluble sulphonic acids, and the sludge was washed with 575 parts by weight of nitrobenzene to extract the sulphonic acids. The nitrobenzene solution containing the sulphonic acids was then washed with 187 parts by weight of water to dissolve therefrom the water-soluble sulphonic acids. The aqueous solution was thereafter neutralized with sodium hydroxide and evaporated to dryness, whereby there was obtained a yield of 32 parts by weight of dry sodium sulphonates. These sulphonates were then treated with a nitrating mixture comprising 290 parts by weight of 93% sulphuric acid and 45 parts by weight of 70% nitric acid at a temperature of about 32° F. for a period of about 1 hour. The resulting nitrosulphonic acids were extracted from the nitration reaction mixture with nitrobenzene, and the nitrobenzene solution washed with water to extract therefrom the water-soluble nitrosulphonic acids. The resulting aqueous solution of nitrosulphonic acids was neutralized with sodium hydroxide and evaporated to dryness and there was obtained 6.5 parts by weight of dry sodium nitrosulphonates having a molecular weight of 543.

The water-soluble nitrosulphonic acids of our invention are characterized in having a molecular weight of at least 245 and comprise, in general, a carbocyclic nucleus having one or more side chains of from 3 to 12 carbon atoms, and at least one sulphonic acid group and one nitro group as nuclear substituents.

Since the water-soluble petroleum nitrosulphonic acids are more readily marketed in the form of their salts, and particularly in the form of their sodium, potassium or ammonium salts, it is to be understood that such salts are equivalent to the free acids and are considered as within the scope of the appended claims.

What we claim is:

1. A water-soluble petroleum carbocyclic nitrosulphonic acid having at least one nuclear side chain substituent containing from 3 to 12 carbon atoms, said acid having a molecular weight of at least 245.

2. In the method of producing a petroleum nitrosulphonic acid compound, the steps which comprise treating a petroleum distillate fraction having an initial boiling point of at least 200° F. with sulphuric acid to effect sulphonation of at least a portion of said distillate, separating unreacted distillate from the acid sludge containing water-soluble sulphonic acids resulting from the sulphonation treatment, treating the acid sludge with a nitrating agent to nitrate the sulphonic acids contained in said sludge, and extracting nitrosulphonic acids from the nitration mixture with an organic solvent capable of dissolving said nitrosulphonic acids but incapable of dissolving substantial quantities of the nitration mixture.

3. In the method of producng a petroleum nitrosulphonic acid compound, the steps which comprise treating a petroleum distillate fraction having an initial boiling point of at least 200° F. with sulphuric acid to effect sulphonation of at least a portion of said distillate, separating unreacted distillate from the acid sludge containing water-soluble sulphonic acids resulting from the sulphonation treatment, treating the acid sludge with a nitrating agent to nitrate the sulphonic acids contained in said sludge, extracting nitrosulphonic acids from the nitration mixture with an organic solvent capable of dissolving said nitrosulphonic acids but incapable of dissolving substantial quantities of the nitration mixture, extracting the nitrosulphonic acids from solution in the organic solvent with water and neutralizing the aqueous solution of acids with sodium hydroxide.

4. In the method of producing a petroleum nitrosulphonic acid compound, the steps which comprise treating a petroleum distillate fraction having an initial boiling point of at least 200° F. with sulphuric acid to effect sulphonation of at least a portion of said distillate, separating unreacted distillate from the acid sludge containing water-soluble sulphonic acids resulting from the sulphonation treatment, treating the acid sludge with a nitrating agent to nitrate the sulphonic acids contained in said sludge, and extracting nitrosulphonic acids from the nitration mixture with nitrobenzene.

5. In the method of producing a petroleum nitrosulphonic acid compound, the steps which comprise treating a petroleum distillate fraction having an initial boiling point of at least 200° F. with sulphuric acid to effect sulphonation of at least a portion of said distillate, separating unreacted distillate from the acid sludge containing water-soluble sulphonic acids resulting from the sulphonation treatment, treating the acid sludge with a nitrating agent to nitrate the sulphonic acids contained in said sludge, extracting nitrosulphonic acids from the nitration mixture with nitrobenzene, extractng the nitrosulphonic acids from solution in the nitrobenzene with water and neutralizing the aqueous solution of acids with sodium hydroxide.

WILLIAM K. GRIESINGER.
BERNARD BETTMAN.

CERTIFICATE OF CORRECTION.

Patent No. 2,245,190. June 10, 1941.

WILLIAM K. GRIESINGER, ET AL.

It is hereby certified that error appears in the printed specification of the above numbered patent requiring correction as follows: Page 1, first column, line 32, after the word "sulphonic" insert --acids--; page 2, first column, line 17, for "(diluted" read --diluted--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.